United States Patent [19]

Iwasyk et al.

[11] 3,789,584
[45] Feb. 5, 1974

[54] APPARATUS FOR SEPARATING VAPOR FROM A VISCOUS LIQUID

[75] Inventors: John M. Iwasyk, Wilmington; David W. Rodeffer, New Castle, both of Del.

[73] Assignee: E. I. du Pont de Nemours and Company, Wilmington, Del.

[22] Filed: Oct. 19, 1972

[21] Appl. No.: 299,094

[52] U.S. Cl. .............................................. 55/201
[51] Int. Cl. ............................................ B01d 57/00
[58] Field of Search.... 23/283, 285; 55/41, 52, 192, 55/199, 201

[56] References Cited
UNITED STATES PATENTS

| | | | |
|---|---|---|---|
| 2,689,839 | 9/1954 | Heckert | 260/78 X |
| 2,719,776 | 10/1955 | Kummel | 264/176 |
| 3,134,655 | 5/1964 | Boucher | 55/199 X |
| 3,241,296 | 3/1966 | Ramsey | 55/199 |
| 3,258,313 | 6/1966 | Griffiths | 23/290 |
| 3,361,537 | 1/1968 | Ferrante | 23/283 |
| 3,469,618 | 9/1969 | Siclari et al. | 159/48 |
| 3,473,896 | 10/1969 | Halder et al. | 23/285 |

*Primary Examiner*—Samih H. Zaharna
*Assistant Examiner*—Richard W. Burks

[57] ABSTRACT

An apparatus is provided for separating vapor from a viscous liquid flowing through a horizontal conduit to the top of an enclosed upright cylindrical vessel and distributing the liquid uniformly to a melt pool centrally rotating about the axis of the vessel. The apparatus comprises a tee-shaped conduit connected to the horizontal conduit so that the through passage of the tee is vertically aligned and enters the vessel. The tee is capped at its upper end. A plate is diametrically positioned in the through passage with one end spaced from the capped end of the tee. The plate extends downwardly beyond the horizontal conduit into the lower end of the tee. A nozzle having a plurality of orifices there-through is connected to the lower end of the tee. The nozzle is in the shape of a sector of a circle with its tip located on the axis of the vessel and has a radius approximately equal to that of the melt pool.

4 Claims, 7 Drawing Figures

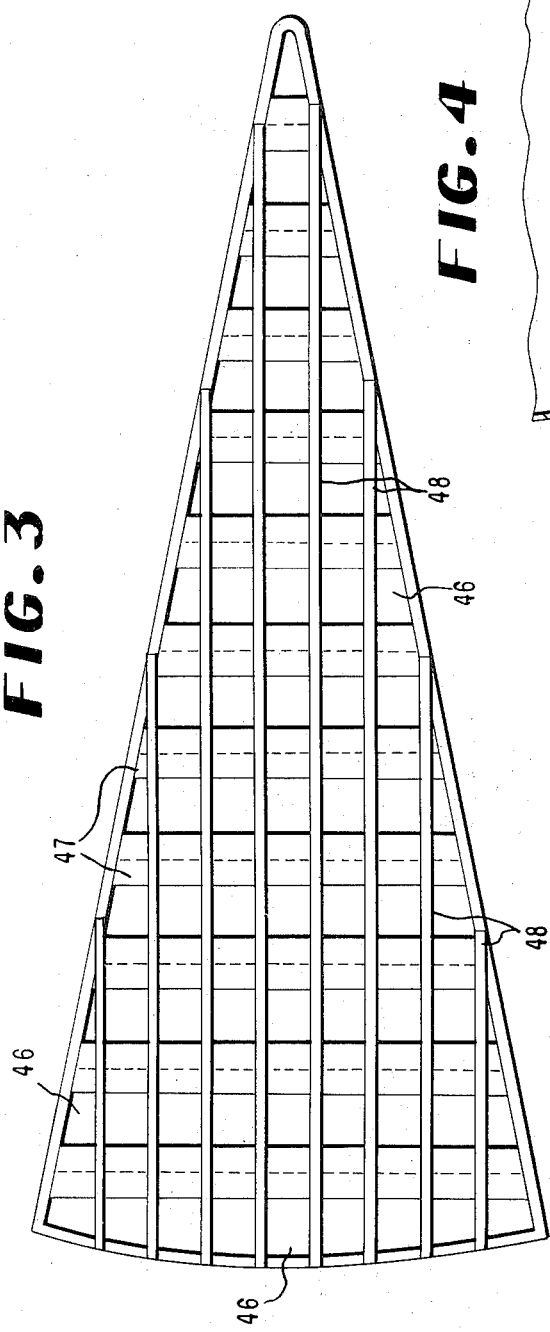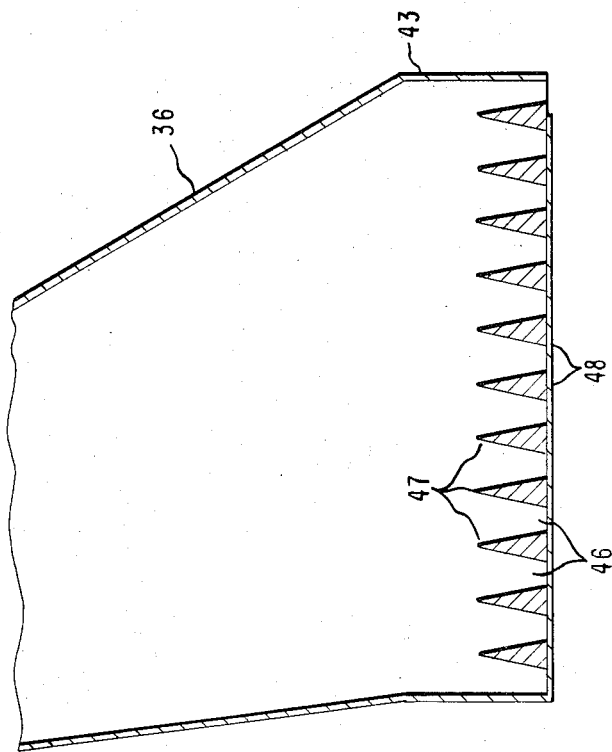

PATENTED FEB 5 1974 3,789,584

APPARATUS FOR SEPARATING VAPOR FROM A VISCOUS LIQUID

BACKGROUND OF THE INVENTION

This invention relates to the production of synthetic polymeric material and, more particularly, to an apparatus useful in producing such material.

Condensation polymers such as the polyamides were initially produced by batch processes in autoclaves, but continuous polymerization processes have been developed and are generally preferred for present day commercial operation. A typical continuous polymerization process (abbreviated "CP" process herein, for convenience) is described by Li in U.S. Pat. No. 3,113,843. The apparatus elements shown in FIG. 1 of Li include a first reactor 10, in which an aqueous polyamide-forming composition is partially polymerized at amidation pressure and temperature; a second reactor 12 wherein polymerization continues at amidation temperature while the pressure is reduced to atmospheric or below, while flashing off steam and a steam polymer separator 14 in which the steam generated by continuing polycondensation is separated from the polymer. For polymer of especially high molecular weight, the separator 14 is conventionally followed by a finisher 16.

Although CPs such as the above and others described in the prior art, function very satisfactorily for the commercial nylons of moderate melt viscosity such as are conventional for poly (hexamethyleneadipamide), the increasing need for ever higher mol. wt. polyamides and the development of polyamides which because of their molecular structure have very high melt viscosity, require new CP technology adapted to handle these viscosities which are typically 5 to 50 times that of 66 nylon used for textile yarns. For some of these polyamides, it is possible to simplify equipment somewhat since they do not form gel on heating which is an ever present problem with adipamide polymers.

It is, therefore, an object of the present invention to provide an improved terminal unit for the flash tube 12, whereby the high velocity steam is disengaged from high viscosity polyamide while the latter continues to polymerize. The invention further provides for separation of steam and polymer and for uniformly distributed delivery of polymer to a slowly rotating pool of molten polyamide. The apparatus of the present invention also has sufficient flexibility so that it is operable at throughput rates over at least a 5 fold range while maintaining constant product characteristics.

SUMMARY OF THE INVENTION

An apparatus is provided for separating vapor from a viscous liquid flowing through a horizontal conduit to the top of an enclosed upright cylindrical vessel and distributing the liquid uniformly to a melt pool centrally rotating about the axis of the vessel. The apparatus comprises a tee-shaped conduit connected to the horizontal conduit so that the through passage of the tee is vertically aligned and enters the vessel. The tee is capped at its upper end. A plate is diametrically positioned in the through passage with one end spaced from the capped end of the tee. The plate extends downwardly beyond the horizontal conduit into the lower end of the tee. A nozzle having a plurality of orifices therethrough is connected to the lower end of the tee. The nozzle is in the shape of a sector of a circle with its tip located on the axis of the vessel and has a radius approximately equal to that of the melt pool.

BRIEF DESCRIPTION OF THE DRAWINGS

FIGs. 3 and 4 are detailed plan and elevation views of the melt distribution nozzle.

DETAILED DESCRIPTION OF THE INVENTION

Figure 1:
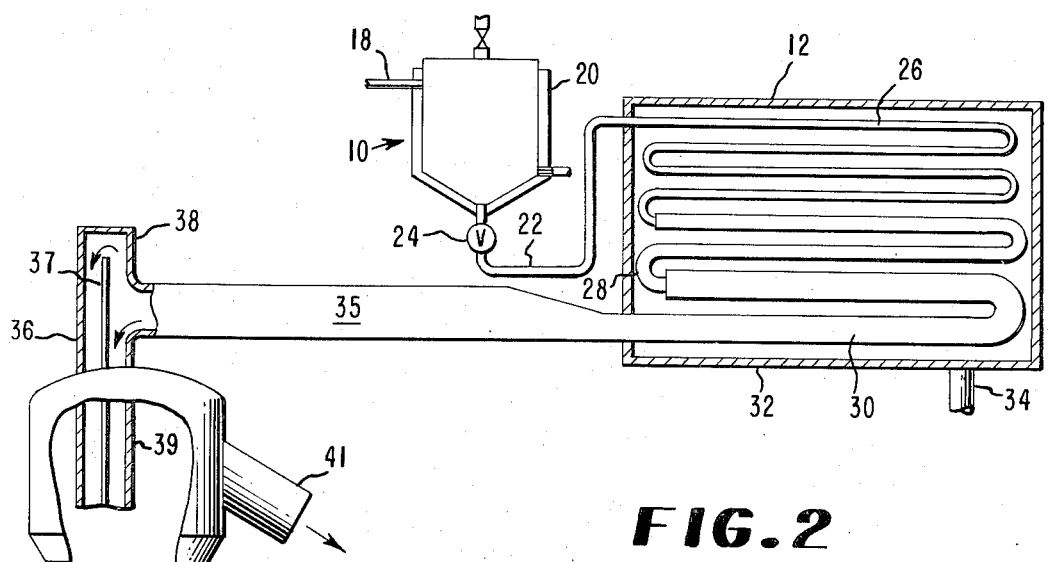
FIG. 1 is a schematic illustration of the CP disclosed by Li, modified with the terminal unit for the flash tube which discharges through baffled tee-shaped conduit into a steam polymer separator.

The polyamide melt and steam feed composition may be prepared by employing the apparatus arrangement shown in FIG. 1, wherein polyamide-forming diamine and dicarboxylic acid reactants in aqueous solution are heated under pressure in reactor 10 to form low molecular weight polymer. It may sometimes be desirable to use two or more reactors 10, in series, so that the reaction can be carried out in stages at different temperatures and/or pressures. The reactor or reactors are conventionally heated by a jacket 20 which may contain diphenyl-diphenyl oxide vapor or other conventional heating fluid.

The partially polymerized composition containing solvent water and water formed by polyamidation is released from reactor 10 through valve 24 via conduit 22 to flash tube 12. Flash tube 12 may consist of three sections 26, 28, 30, of tubing which are series connected and of successively increased diameter. The tubes 26-30 are surrounded by a heating jacket 32 to which heating fluid is supplied through pipe 34.

In accord with the invention, the output of reaction products from the tube 30, are passed to a greatly enlarged section of horizontally disposed pipe 35, hereinafter called a "tail pipe," in which the polymer changes its flow regime from "annular" to "wave," or from annular to "wave-annular," thus, allowing the steam to disengage itself from the polymer and occupy the upper portion of tail pipe 35. The steam and polymer impinge on baffle 37 which is diametrically positioned in tee 38 from somewhat below the capped or upper end of the tee to a point in the lower end of the tee. The polymer flows downward in half (39) of conduit 36, on its way to the melt pool 40 in steam polymer separator 14. The steam passes over the top of baffle 37 and is diverted downward by the closed end of tee 38 into steam polymer separator 14 via the other half of conduit 36. Both steam and polymer are delivered to separator 14 by specially designed nozzles shown in FIG. 2 but not shown in FIG. 1. Steam which is disengaged from the polymer leaves separator 14 through steam vent 41 which may be attached to a condenser, vacuum pump, or aspirating jets (not shown), depending on the reaction conditions desired in separator 14.

The polymer discharged collects in melt pool 40 from which is discharged at 42 by conventional means (not shown).

It will be apparent that all of vessel 14 and conduits 35, 36 and 38 must be provided with suitable heating jackets (not shown).

Figure 2:
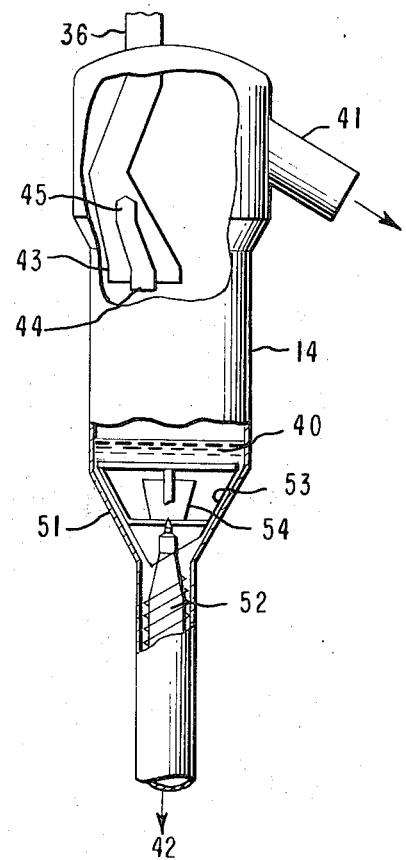
FIG. 2 is a schematic illustration of a steam polymer separator with the melt distribution nozzle in place.

FIG. 2 shows the separator 14 and associated equipment in somewhat greater detail. For clarity, conduit 36 has been turned through 90° so that baffle 37 is in the plane of the figure and tail pipe 35 is perpendicular to the figure. FIG. 2 shows melt distributor nozzle 43 and steam nozzle 44. Baffle 37 leaves the center line of conduit 36 below the bend in 36 and is so constructed as to divert all the steam through opening 45 in the side of conduit 36, and thence, to steam nozzle 44. The polymer accumulates in a layer in pie-shaped melt distribution nozzle 43, whence, it falls in a plurality of streams into melt pool 40. Conduit 36 is show as having a bend or "dog leg" this is preferred but is not essential to uniformize the distribution of melt onto nozzle 43.

FIG. 3 shows a plan view of the melt distribution nozzle 43, while FIG. 4 shows the same nozzle in sectioned elevation attached to conduit 36. As is apparent from FIG. 3, the melt outlet nozzle has the configuration of the sector of a circle. It delivers the polymer to the melt pool in a plurality of streams, via rectangular orifices 46. The transverse rows of orifices are separated by wedge-shaped bars 47 which help to provide a small resistance to flow needed to retain enough polymer above the nozzle so that it is always completely covered with polymer even at lowest throughput. The bars are wedge-shaped (apex upward) so as to avoid forming stagnant polymer areas between the rows of holes. Additional flow resistance is furnished by a series of rods 48 welded to the bottom of the wedges 47; these rods also serve to prevent the polymer streams form coalescing below the nozzle.

Desirably, within the geometrical limits imposed by the shape of the nozzle, the hole area (and number of holes, if uniform in size) should increase in proportion to the radial distance from the apex of the nozzle so that the polymer discharged will be evenly distributed over the rotating melt pool below. It is also essential, as indicated previously, to have enough hole area so that the polymer layer does not build up at high throughput rates so that it overflows into the steam side of conduit 36.

Figure 5:
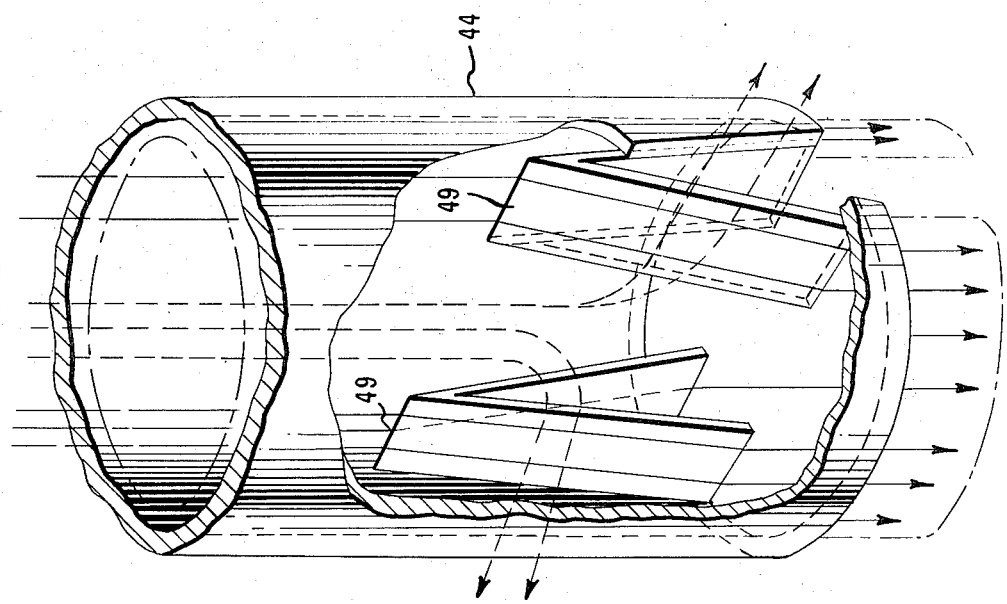
FIG. 5 shows a prior art steam nozzle which is preferred for use with the instant invention.

FIG. 5 shows a suitable nozzle which may be used as steam nozzle 44. It is the nozzle shown in FIG. 3 of U.S. Pat. No. 3,134,655 and is not claimed herein. Its special feature is embodied in the two notches with roof-like diverters 49 which divide any entrained polymer flowing down the walls of the nozzle so that it is not spattered by escaping steam onto the walls of separator 14.

Figure 6:
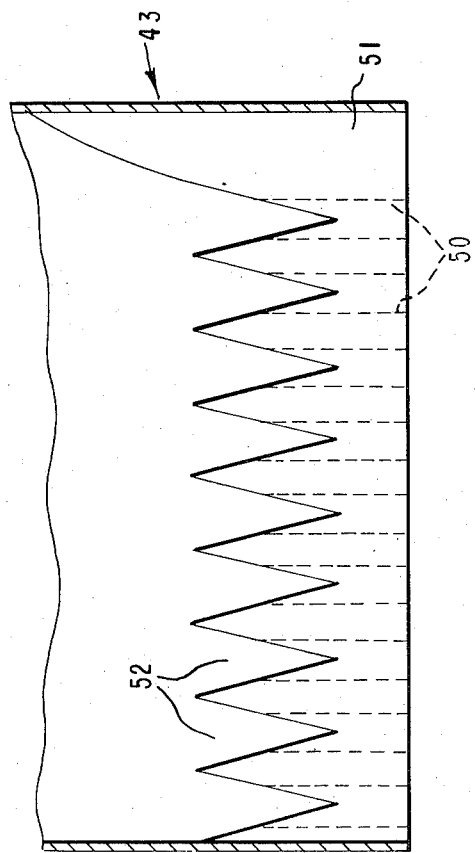
FIGS. 6 and 7 show in elevation and plan another embodiment of the melt distribution nozzle.
Figure 7:
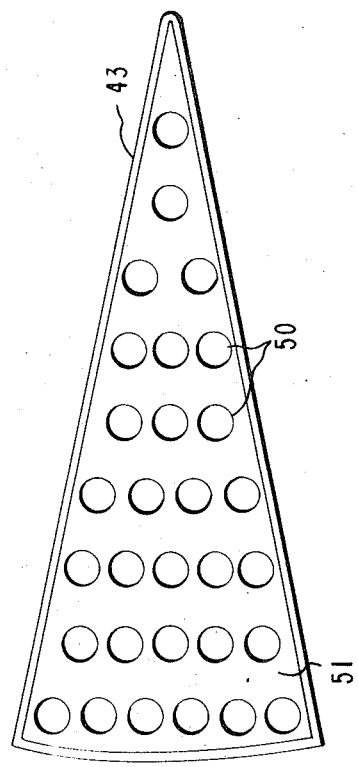

FIGS. 6 and 7 show in elevation and plan another embodiment of melt distributor nozzle 43. As seen in FIG. 7, the nozzle has the same sector shape as in FIG. 3, but employs circular polymer distribution holes 50. These are conveniently drilled in a block of metal 51 which is welded into the bottom of conduit 36. The holes are drilled in the bottom of transverse V-shaped grooves 52, milled in 51 before assembly, to provide a streamline entrance to the orifices and avoid stagnant areas.

The steam polymer separator 14 (FIG. 2) into which nozzle 43 discharges molten polymer, is a rather tall, cylindrical vessel with its axis vertical. The vessel has a conical bottom 51, which directs the polymer melt to a screw pump 52. Attached to the upper end of the screw of the pump 52 is a conical basket-like arrangement 53 and a cup, open top and bottom which (in combination) serve to provide plug type flow of the polymer as it traverses melt pool 40. Since the basket and cup are attached to the screw of the pump, they rotate with it and due to liquid drag of the highly viscous melt, the melt pool also rotates. Screw speeds of 2 to 10 rpm are convenient, although higher speeds may be employed; about 4–5 rpm is preferred. Since the melt distributor nozzle 43 is positioned with its apex almost on the axis of separator 14 and its base close to the wall of 14, and since it delivers polymer uniformly over a sector of the melt pool immediately below, it necessarily follows that an even layer of molten polymer is laid down on the melt pool as it is rotated by basket 53 and cup 54.

The advantages of the invention are obtained by passing a high velocity mixture of steam and polyamide melt from a conventional flash tube of diameter $d_1$ into a conduit of larger diameter $d_2$, whereby the flow mode of the melt changes from wave-annular to wave or from annular to wave annular while the high velocity steam is disengaged from the polymer. To change the flow pattern, the ratio of $d_1$ to $d_2$ must be critically selected to avoid unstable or "slug" flow and to maximize holdup. The separated steam and polymer melt impinge on a vertically disposed baffle, the melt falling downward under the influence of gravity and discharging from a nozzle of special construction into a slowly rotating pool of molten polymer. The melt pool is contained in a vessel adapted to complete the separation of steam and polymer and provide additional hold-up time for further polymerization under vacuum, if desired.

The disengaged steam, essentially free from entrained polymer, passes over the top of the baffle, then downwards, discharging into the vapor space above said rotating melt pool.

The disengaged steam is vented from the separator vessel into the atmosphere, optionally through a vacuum pump or jet.

The melt distributor nozzle has an outlet which is shaped like the sector of a circle of radius approximately equal to that of the melt pool and with the tip of the sector approximately on the axis of the separator vessel. The distributor nozzle terminates in an apertured grille providing enough flow resistance so that polymer collects in a layer which is at least deep enough to cover all the openings; the flow resistance of the grille is kept low enough so that even at maximum throughput, the melt does not build up and flood over into the steam discharge. The flow resistance is kept small by providing a large number of adequately sized openings which are spaced at least about 1/8 inch apart. This spacing prevents the melt streams from coalescing, thereby, providing a uniform distribution as they fall into the melt pool. The distribution of the melt streams is such that they increase in number in proportion to the radial distance from the sector apex of the nozzle, thereby, distributing the melt uniformly in a radial direction onto the surface of the rotating melt pool.

The rotating melt pool, the means by which it is rotated, and the steam polmer separator vessel containing it form no part of the instant invention; the instant invention is, of course, especially adapted and has a major utility to supply such a vessel and its melt pool with properly separated, high viscosity polymer.

It is evident that the diameter $d_2$ of tail pipe 35 must be carefully selected if the proper wave-type of fluid flow is to exist in it, for any given conditions of polymer viscosity, polymer flow rate, steam flow rate and flasher tube diameter $d_1$.

For general purposes, the proper pipe diameter $d_2$ for any pipe $d_1$ can be determined by selecting pipe sizes that will put operating conditions in the stratified, wave or wave-annular region of a Baker plot (see Oil and Gas Journal, Nov. 19, 1958, pp. 156–167).

When the gas is steam at 1 atmosphere and 310°C., and the polymer is essentially of unit specific gravity, as in the Example, $d_2$ is selected such that steam flow G, in lbs. per seconds per square foot of pipe area, lies between 0.01 and 10.

The length of the pipe is adjusted to provide the desired hold-up time for further reaction, if needed.

The following example illustrates the operation of the apparatus of the invention at a throughput of 70 lbs. polymer per hour, using computations based on experimental data.

EXAMPLE

This example shows the use of the apparatus of the invention with a polyamide which is the reaction product of bis (4-aminocyclohexyl) methane (70 percent trans-trans stereoisomer) and dodecane dioic acid (identified as PACM-12, for convenience).

Partly polymerized, low molecular weight PACM-12 polymer of about 7500 mol. wt. and associated steam are discharged from the outlet of flasher 12 (FIG. 1). The flasher tail pipe 35 and conduit 36 are maintained at 310°C. The weight ratio of polymer to steam is 0.53 to 0.47. Within tube 30, which has an internal diameter of 1.05 inches, the flow is of the wave-annular type. At the flash tube exit, the polymer has a melt viscosity of about 180 poise.

The steam polymer mixture is discharged into tail pipe 35 which has an inside diameter of 3.8 inches. This tail pipe is 5 ft. 10 in. long and the tapered transition piece is 1 ft. 4 in. long. The flow becomes wave-type within the enlarged tail pipe; the polymer fills about 55 percent of the volume of the pipe. The holdup time for the polymer in the pipe is about 20 min. At the outlet of the pipe at baffle 37, the molecular weight is 12,000 and the melt viscosity is 1200 poise.

Steam is separated from the polymer and the polymer is distributed uniformly onto the melt pool as it flows from nozzle 43 which is constructed as shown in FIGS. 3 and 4. The steam is discharged from nozzle 44 (as shown in FIG. 5) and leaves separator vessel 14 through side vent pipe 41.

The apparatus operates smoothly without forming polymer "slugs" and without "channeling."

Although the operation of the apparatus of the invention has been illustrated in terms of PACM-12 polyamide, it is not, of course, limited to this polymer. Its utility is greatest when processing any polymer having a melt viscosity (at processing temperatures) of 1000 to 5000 poise or higher, and from which one wishes to separate a volatile reaction product or solvent. The flash tube 35 is especially useful for other than adipamide polymers due to the tendency of the polyadipamides to form gel when in contact with heated surfaces at low flow rates, in 35; even with such polymers, gel deposition can be minimized or eliminated by injecting additional steam into the flash tube at some point ahead of the tail pipe.

What is claimed is:

1. An apparatus for separating vapor from a viscous liquid flowing through a horizontal conduit to the top of an enclosed upright cylindrical vessel and distributing said liquid uniformly to a melt pool centrally rotating about the axis of said vessel, said apparatus comprising: a tee-shaped conduit connected to said horizontal conduit, the through passage of the tee being vertically aligned and entering said vessel, said tee being capped at its upper end; a plate diametrically positioned in said through passage, said plate having one end spaced from the capped end of the tee, said plate extending downwardly beyond said horizontal conduit into the lower end of the tee; and a nozzle having a plurality of orifices therethrough connected to said lower end, said nozzle being in the shape of a sector of a circle and having a radius approximately equal to that of the melt pool, said sector having a tip located on the axis of said vessel.

2. The apparatus of claim 1, the area of said orifices increasing in proportion to the radial distance from the tip of said nozzle.

3. The apparatus as defined in claim 1, said liquid having a viscosity of from 1000 to 5000 poise.

4. An apparatus for separating vapor from a viscous liquid flowing through a horizontal conduit to the top of an enclosed upright cylindrical vessel and distributing said liquid uniformly to a melt pool centrally rotating about the axis of said vessel, said apparatus comprising: a tee-shaped conduit connected to said horizontal conduit, the through passage of the tee being vertically aligned and entering said vessel, said tee being capped at its upper end; a plate diametrically positioned in said through passage, said plate having one end spaced from the capped end of the tee, said plate facing and extending downwardly beyond said horizontal conduit into the lower end of the tee dividing said through passage in half, one of the halves of said passage being adjacent said horizontal conduit for transporting said viscous liquid, the other half for transporting steam separated from said liquid impinging said plate; and a nozzle having a plurality of orifices therethrough connected to said one half of said through passage at said lower end of the tee, said nozzle being in the shape of a sector of a circle and having a radius approximately equal to that of the melt pool, said sector having a tip located on the axis of said vessel.

* * * * *